United States Patent
Rossmann

(10) Patent No.: US 6,394,513 B2
(45) Date of Patent: May 28, 2002

(54) ROAD BLOCK, MOUNTED AT THE REAR END OF A VEHICLE

(76) Inventor: Michael Rossmann, Hohenleiten 2, D-82547 Eurasburg (DE)

( * ) Notice: Subject to any disclaimer, the term of this patent is extended or adjusted under 35 U.S.C. 154(b) by 0 days.

(21) Appl. No.: 09/753,440

(22) Filed: Jan. 3, 2001

(30) Foreign Application Priority Data

Feb. 5, 2000 (DE) .......................................... 100 05 223

(51) Int. Cl.[7] ............................................ B60R 19/34
(52) U.S. Cl. ........................ 293/117; 296/118; 296/133
(58) Field of Search ............................... 293/117, 118, 293/133

(56) References Cited

U.S. PATENT DOCUMENTS

| | | | |
|---|---|---|---|
| 4,190,275 A | 2/1980 | Mileti | 293/102 |
| 4,711,481 A | 12/1987 | Krage et al. | 293/133 |
| 5,673,953 A | * 10/1997 | Spease | 293/118 |
| 6,183,042 B1 | * 2/2001 | Unrath | 293/133 X |

FOREIGN PATENT DOCUMENTS

| | | | |
|---|---|---|---|
| DE | 69224217 | 8/1998 | |
| JP | 406156168 | * 6/1994 | 293/118 |

* cited by examiner

*Primary Examiner*—Dennis H. Pedder
(74) *Attorney, Agent, or Firm*—Notaro & Michalos P.C.

(57) ABSTRACT

This invention refers to a road block which is mounted at the rear end of a road vehicle (1) and comprises a vertical warning panel (7) for protecting a site of road works, and a crash attenuator (4), the latter being tiltable about a transversal axis (6) from a horizontal operative position into a vertical rest position suited for transportation, whereas the warning panel (7) can be moved between guidance means (9) substantially in a translational motion from an upper operational position and to a lower rest position. The tilting movement of the attenuator (4) is coupled to the translational motion of the warning panel (7) via cables or chains (11) in such a way that the attenuator and the warning panels move synchronously to the rest or operational position.

8 Claims, 2 Drawing Sheets

ROAD BLOCK, MOUNTED AT THE REAR END OF A VEHICLE

FIELD OF THE INVENTION

The invention relates to a road block which is mounted at the rear end of a road vehicle and comprises a vertical warning panel for protecting a site of road works, and a crash attenuator, the latter being tiltable about a transversal axis from a horizontal operative position into vertical rest position suited for transportation, whereas the warning panel can be moved substantially in a translational motion between an upper operational position and a lower rest position.

The protection of temporary work sites, notably on highways, requires crash attenuators which can be mounted at the rear end of road work vehicles. A warning panel is mounted above and in front of the attenuator and is generally provided with pulsating light signals such as arrows.

BACKGROUND OF THE INVENTION

Crash attenuators which absorb the crash energy and are susceptible to protect both vehicles and their occupants against severe damages are well known, e.g. from European Patent 0 674 052 or U.S. Pat. No. 4,190,275.

Road blocks according to the preamble part of the annexed claim 1 are well known and in daily use on German highways. Their crash attenuators should be rather long in order the provide a sufficient deceleration path. On the other hand, the length is limited by the tolerable charge supported at the rear side of the vehicle and by the necessity to transport the attenuator in an upright position.

The tilting movement of the attenuator requires powerful electrical or hydraulic motors. The warning panel which in most cases is as large as the vehicle must be accurately guided during its translational movement in order to avoid canting. This requirement results in two synchronous driving means on both sides of the warning panel. Moreover, the transition between the operational and the rest position and vice versa requires a plurality of manipulations which in an emergency case consume too much time. Finally, if the motors fail to operate, several persons are necessary to move the road block from one into the other position.

SUMMARY OF THE INVENTION

Therefore, the invention aims to improve a road block of the above defined type by reducing the number of motor means and their driving power and allowing operation by only one person even if the motors fail to operate.

This aim is achieved by the road block which is mounted at the rear end of a road vehicle and comprises a vertical warning panel for protecting a site of road works, and a crash attenuator, the latter being tiltable about a transversal axis from a horizontal operative position into a vertical rest position suited for transportation, whereas the warning panel can be moved substantially in a translational motion between guidance means from an upper operational position to a lower rest position, wherein the tilting movement of the attenuator is coupled to the translational movement of the warning panel via cables or chains in such a way that the attenuator and the warning panels move synchronously to the rest or operational position.

Preferred embodiments of the invention are defined in the secondary claims.

The invention will now be described in detail with reference to the attached drawings.

THE DRAWINGS

DESCRIPTION OF A PREFERRED EMBODIMENT

Figure 1:
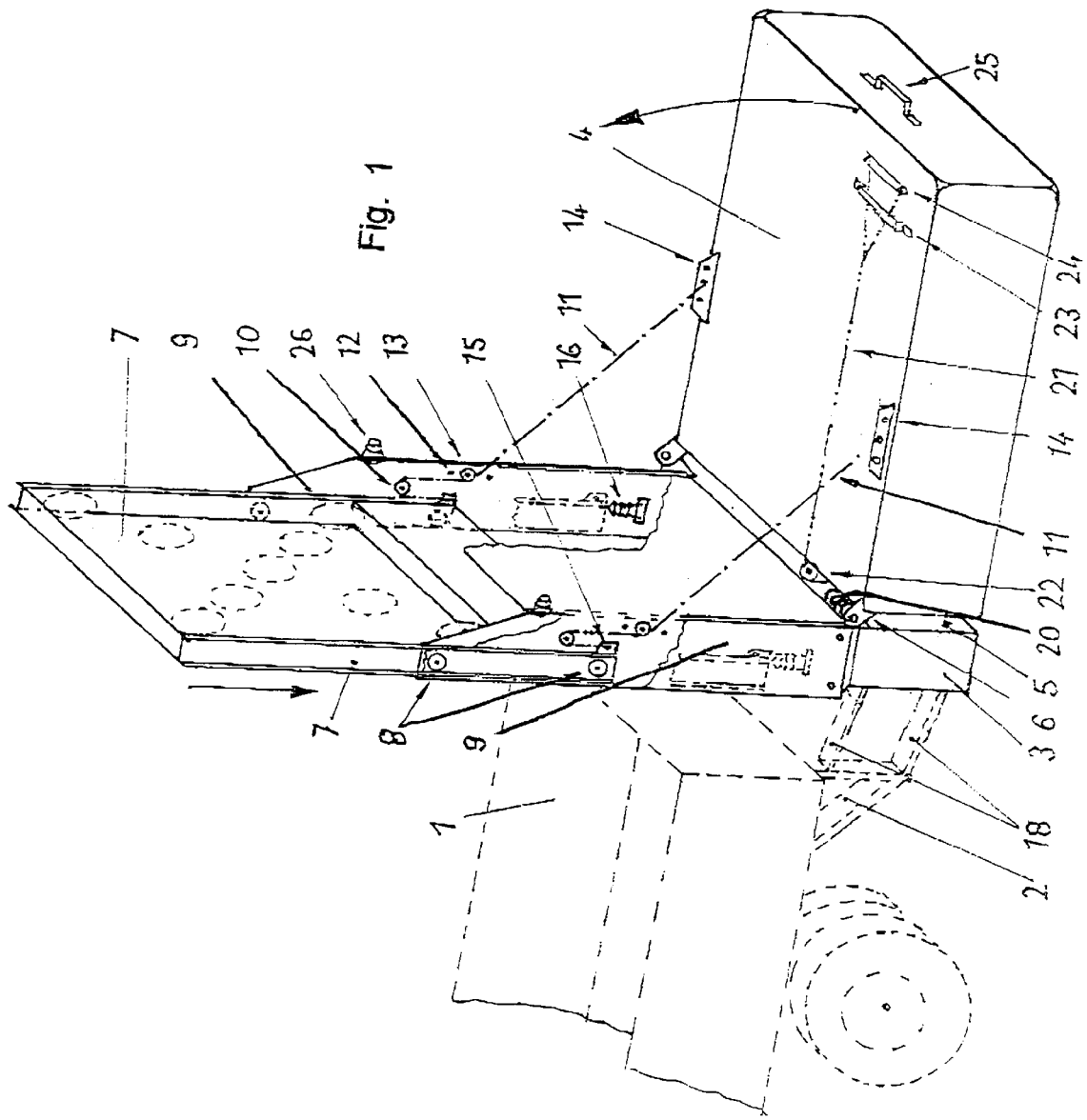
FIG. 1 shows schematically and in perspective a road block according to the invention in operative position.

In FIG. 1 a vehicle 1 is shown in interrupted lines. The road block according to the invention, more particularly a base beam 3 thereof, is coupled to the vehicle chassis 2 through coupling rods 18. The road block mainly comprises a crash attenuator 4 whose inner structure may be the same as that described in the above cited patents. In the operational position as shown in FIG. 1, the crash attenuator is horizontal, i.e. parallel to the road surface and slightly above the latter. Along the tilt axis 6 the attenuator is linked to the base beam 3 and it is suspended in this horizontal state by two lateral cables or chains 11.

A warning panel 7 is guided in two vertical rails 9 fixed to the base beam and allowing a translatoral movement of the panel 7 from the operational position as shown in FIG. 1 to a rest position suitable for the transport. In this latter position the lower edge of the warning panel may rest on adjustable stops 16 attached to both rails. In order to reduce the friction, guide means such as rollers 8 well known in the art are mounted in the rails 9 or at the warning panel 7.

According to the invention the movement of the crash attenuator 4 during transfer from one position to the other is coupled through the cables 11 to that of the warning panel 7. One end of each cable 11 is anchored via a respective coupling member 15 to the lower edge of the panel whereas the other end is anchored via respective mounts 14 to the crash attenuator. These mounts present several anchoring points whose function will be explained further-on. The cables 11 extend from the coupling members 15 upwards, then they pass over first pulleys 10 and downwards to second pulleys 13 fixed to the respective rail 9. In the operational position shown in FIG. 1 the cables thereafter reach an anchor point of the respective mount 14 through a sloping path.

Figure 2:
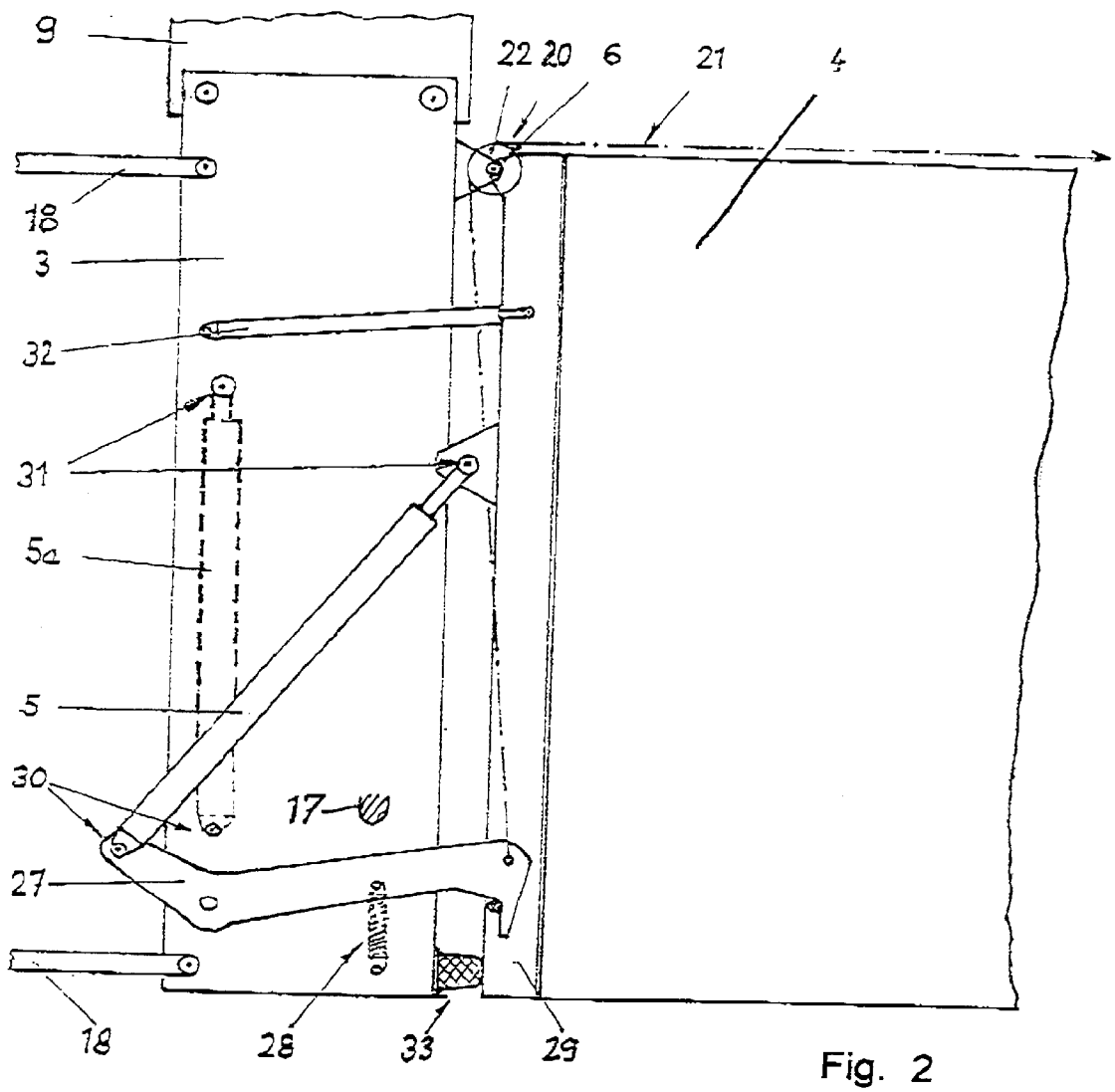
FIG. 2 shows a detail of the road block according to FIG. 1 with the side covering being withdrawn.

FIG. 2 shows a side view of a portion of the road block according to the invention, i.e. the zone of the base beam 3 whose covering has been withdrawn in order to allow inspection of the mechanics. A pawl 27 is pivotably mounted to the beam 3 and maintains, in the operational position, the attenuator, more particularly its frame 29, in close contact with a stop 33 of the beam 3. This ensures that a crashing vehicle lifts the attenuator up. A helical spring 28 holds the pawl 27 in the locking position. In FIG. 2 there is further shown a hydraulic cylinder 5 which is linked to the pawl 27 beyond its pivot axis in such a way that the activation of the cylinder causes the pawl to move against the retaining force of the spring and in anti-clockwise direction towards a stop 17 thereby unlocking the attenuator. Thereafter, the continuing action of the cylinder lifts the attenuator about the tilt axis 6 upwards by about 90° into the rest position suitable for transport.

The tilting movement can be supported by a pre-stressed torsional spring 20 extending along the tilt axis and/or by a pressure gas spring 32 located between the base beam 3 and the frame 29 of the attenuator 4.

This conception allows one operator without further help to transfer the attenuator into the rest position. During the return to the operational position the pawl remains unlocked until the cylinder 5 is discharged when the frame 29 contacts the stop 33. Thereafter the pawl is locked automatically by means of the spring 28.

Due to the cable coupling, the weight of the warning panel 7 makes the latter sliding downwards as soon as the attenuator 4 is lifted. Correspondingly the weight of the warning panel helps drawing the heavy attenuator into its upright rest position. Therefore, the energy which must be supplied by the hydraulic cylinder for lifting the attenuator can be reduced considerably. In the rest position, the anchor points of the mounts 14 are close to the lower level of the circumference of the pulleys 13 which is optimal for maintaining the attenuator upright just by the weight of the warning panel through the cables 11. Of course, a pawl (not shown), which locks automatically and which can be manually unlocked, can be foreseen to better ensure this position during transport.

The well defined position of the attenuator in the rest position is ensured by stops 26 mounted to the rails 9.

It might be useful, to provide a further rest position according to which the warning panel remains visible to other traffic participants during transport. This can be achieved by vertically displacing the second pulleys 13. To this end, corresponding series 12 of holes for mounting these pulleys are provided on both rails 9. If this second rest position is desired, then the pulleys 13 are mounted in the lowermost holes of the series 12 and the anchor points closest to the axis 6 of the mounts 14 for anchoring the cables are selected, whereas the warning panel disappears completely behind the attenuator in the rest position by choosing the holes for mounting the pulleys 13 and the anchor points of the mounts 14 at the other end of the respective series.

It should be noted that in spite of the important width of the warning panel, there is no risk of canting since the two cables 11 ensure in cooperation with the tilting axis under all conditions the perfect parallel guiding of the warning panel 7.

There is a need for a manual operation of the transfer from the rest position into the operational position or vice-versa, since this transfer should be possible even if no hydraulic pressure is available. Due to the inventive coupling of the warning panel with the attenuator this manual operation is considerably facilitated since the antagonistic weight of the warning panel and the additional passive energy accumulators such as the torsional spring 20 and the gas pressure spring 32 complements the operator's muscle force in order to lift the heavy attenuator 4. In this case the hydraulic cylinder 5 which is coupled to the pawl 27 and the frame 29 of the attenuator by bolts can be dismounted and stored at a convenient storage place 5a. The unlocking and locking of the pawl 27 against the force of the spring 28 is in this case achieved by a cable 21, which is coupled to the pawl 27 and conducts via a pulley 22 to a handle 24 behind a retainer 23 at the attenuator end remote from the axis 6. By these means one operator alone is able to unlock the pawl 27 through the handle 24 and then to lift the attenuator in the upright position (or vice-versa).

It is advantageous to ensure that the warning panel is not torn out of the guiding rails due to a crash impact. This can be achieved by mounting at least some of the guide rollers in yield bearings which absorb an impact.

The invention is not restricted in all details to the embodiment as described above: The driving element can also be displaced from the attenuator to the cables or (preferably) chains or to only one of these chains by coupling a motor to one of the pulleys 10. This possibility has only been offered by the invention since only a small electrical power is required in addition to the force supplied by the weight of the warning panel. The risk of canting is also avoided during manual operation due to the parallel guidance imposed by the cables.

In the framework of the invention the unique pawl 27 can be completed by a second, parallel pawl and a common control for both pawls.

What I claim is:

1. A road block which is mounted at the rear end of a road vehicle (1) and comprises a vertical warning panel (7) for protecting a site of road works, and a crash attenuator (4), the latter being tiltable about a transversal axis (6) from a horizontal operative position into a vertical rest position suited for transportation, whereas the warning panel (7) can be moved between guidance means (9) substantially in a translational motion from an upper operational position and to a lower rest position, wherein the tilting movement of the attenuator (4) is coupled to the translational motion of the warning panel (7) via cables or chains (11) in such a way that the attenuator and the warning panels move synchronously to at least one of the rest and operational position.

2. Road block according to claim 1, wherein the warning panel (4) is guided in lateral rails (9) to which pulleys (10, 13) are fixed for receiving said cables or chains.

3. Road block according to claim 2, wherein the warning panel (7) is guided in the rails (9) via rollers (8).

4. Road block according to claim 1, wherein at least one torsional spring (20) is disposed along the tilt axis (6) which complement the force for lifting the attenuator (4).

5. Road block according to claim 1, wherein at least one gas pressure spring (32) is provided which complements the force for lifting the attenuator (4).

6. Road block according to claim 1, wherein a controllable hydraulic cylinder (5) supplies the force for tilting the attenuator (4) into the rest position.

7. Road block according to claim 1, wherein a locking pawl (27) locks the attenuator (4) in the operational position.

8. Road block according to claim 6, wherein the locking pawl (27) is coupled to the hydraulic cylinder (5) in such a way that it is unlocked as soon as the cylinder is powered.

* * * * *